(12) United States Patent
Onfroy et al.

(10) Patent No.: US 10,414,489 B2
(45) Date of Patent: Sep. 17, 2019

(54) AIRCRAFT LANDING GEAR

(71) Applicant: SAFRAN LANDING SYSTEMS, Velizy Villacoublay (FR)

(72) Inventors: Dominique Onfroy, Velizy-Villacoublay (FR); Philippe Chico, Velizy-Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 15/464,420

(22) Filed: Mar. 21, 2017

(65) Prior Publication Data
US 2017/0267336 A1    Sep. 21, 2017

(30) Foreign Application Priority Data
Mar. 21, 2016 (FR) ..................................... 16 52427

(51) Int. Cl.
*B64C 25/44* (2006.01)
*B64C 25/36* (2006.01)
(Continued)

(52) U.S. Cl.
CPC .............. *B64C 25/44* (2013.01); *B64C 25/36* (2013.01); *B64C 25/42* (2013.01); *B64F 5/40* (2017.01); *B64F 5/50* (2017.01); *F16D 55/24* (2013.01); *F16D 55/38* (2013.01); *F16D 65/0043* (2013.01); *F16D 65/16* (2013.01); *F16D 65/186* (2013.01); *F16D 2055/0008* (2013.01); *F16D 2250/0084* (2013.01)

(58) Field of Classification Search
CPC ......... B64C 25/44; B64C 25/36; F16D 55/24; F16D 65/16

USPC ............................................... 188/71.5, 18 A
See application file for complete search history.

(56) References Cited

U.S. PATENT DOCUMENTS 2,540,346 A    2/1951  Potter
4,290,505 A *  9/1981  Kramer .................. B60T 1/065
                                                        188/18 A
(Continued)

FOREIGN PATENT DOCUMENTS

DE        1270416 B       6/1968
EP      1 084 949 A2      3/2001
(Continued)

OTHER PUBLICATIONS

French Search Report for application No. FR 1652427 dated Dec. 5, 2016.

*Primary Examiner* — Vishal R Sahni
(74) *Attorney, Agent, or Firm* — Sughrue Mion, PLLC

(57) ABSTRACT

An aircraft landing gear comprising an axle (100), a wheel (102) borne by the axle, a stack of discs (104) arranged to impose a braking torque on the wheel in response to a pressure imposed on the stack of discs, at least one electromechanical actuator (106) extending facing the stack of discs in order in a controlled manner to apply the imposed pressure to the stack of discs, and an actuator bearer (107) designed to bear the electromechanical actuator. The electromechanical actuator is fixed to the actuator bearer while at the same time being demountable. The actuator bearer is incorporated into the axle in such a way that the axle and the actuator bearer form a single component. There also is a method of demounting a stack of discs from such a landing gear.

11 Claims, 3 Drawing Sheets

(51) Int. Cl.
*F16D 55/24* (2006.01)
*F16D 65/16* (2006.01)
*B64C 25/42* (2006.01)
*F16D 55/38* (2006.01)
*F16D 65/00* (2006.01)
*F16D 65/18* (2006.01)
*B64F 5/50* (2017.01)
*B64F 5/40* (2017.01)
*F16D 55/00* (2006.01)

(56) References Cited

U.S. PATENT DOCUMENTS

| | | | | |
|---|---|---|---|---|
| 4,696,376 A | * | 9/1987 | Reynolds | F16D 55/36 188/18 A |
| 5,107,968 A | * | 4/1992 | Delpassand | B60C 23/18 188/264 G |
| 5,323,881 A | * | 6/1994 | Machan | F16D 55/36 188/18 A |
| 5,437,352 A | | 8/1995 | Harker | |
| 5,494,138 A | * | 2/1996 | Scelsi | F16D 55/36 188/18 A |
| 5,862,890 A | * | 1/1999 | Long | F16D 55/36 188/71.5 |
| 6,095,293 A | * | 8/2000 | Brundrett | F16D 55/36 188/18 A |
| 6,302,244 B1 | * | 10/2001 | Kernik | F16D 55/40 188/71.5 |
| 6,581,730 B1 | * | 6/2003 | Haydon | B60T 1/065 188/18 A |
| 7,200,913 B2 | * | 4/2007 | Laird | B60B 29/002 29/281.4 |
| 2007/0209884 A1 | * | 9/2007 | Tong | B64C 25/42 188/18 A |
| 2010/0140027 A1 | * | 6/2010 | Baden | F16D 55/36 188/71.5 |

FOREIGN PATENT DOCUMENTS

JP 45-405 Y1 1/1970
WO 96/12118 A1 4/1996

* cited by examiner

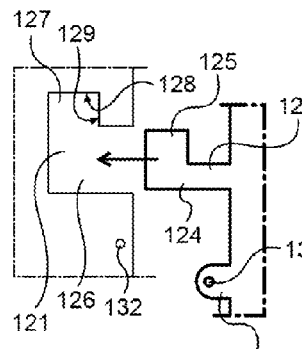
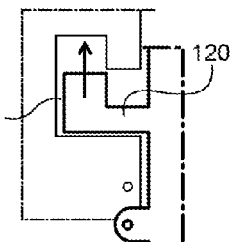
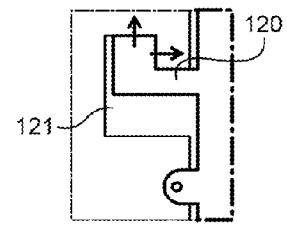
Fig. 3a  Fig. 3b  Fig. 3c
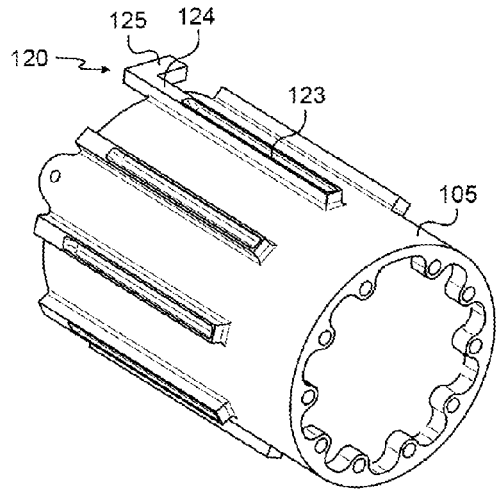
Fig. 4
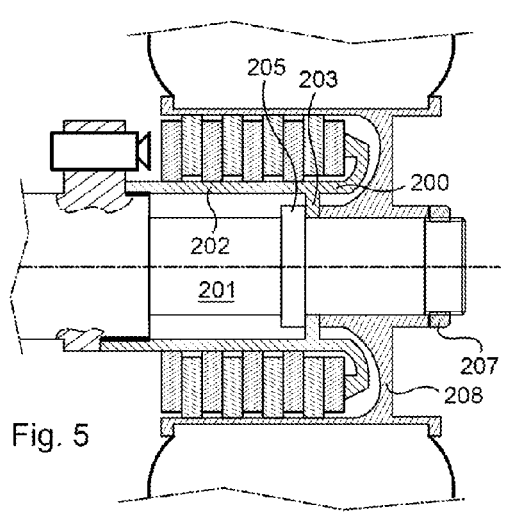
Fig. 5
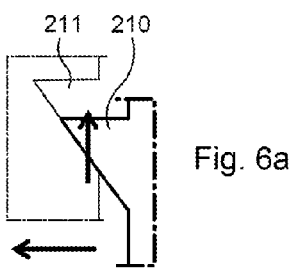
Fig. 6a
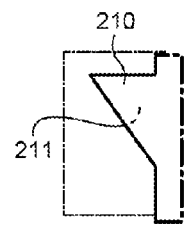
Fig. 6b

__US 10,414,489 B2__

AIRCRAFT LANDING GEAR

BACKGROUND OF THE INVENTION

With reference to FIG. 1, a brake 1 intended to brake a wheel 2 borne by an axle 3 of an aircraft landing gear conventionally comprises a stack of discs 4 comprising an alternation of rotor discs and of stator discs which extend around the axle 3 and which are designed to impose a braking torque on the wheel 2 in response to a pressure imposed on the stack of discs 4.

The brake 1 in this instance is incorporated into an "electrical" braking system and comprises an actuator bearer 5 equipped with electromechanical actuators 6. If the brake 1 were incorporated into a "hydraulic" braking system it would comprise a hydraulic ring fitted with pistons.

The electromechanical actuators 6 are commanded to apply the imposed pressure to the stack of discs 4 when it is appropriate to brake the wheel 2.

The brake 1 further comprises a torque tube 7 to which the stator discs of the stack of discs 4 are rotationally secured. The actuator bearer 5 is, for example, attached to the torque tube 7 and secured to the torque tube 7 by fixing screws, or alternatively forms a monobloc assembly (a single component) with the torque tube 7.

The brake 1, which means to say the stack of discs 4, the actuator bearer 5, the electromechanical actuators 6 and the torque tube 7 is demountable and can be handled as an assembly.

Blocking the rotation of the brake 1 with respect to the axle 3 and therefore reacting the braking torque are roles played by a pin 8 connecting a carrier 9 situated on the brake 1 and a carrier 10 situated on the landing gear. The brake is then said to be a "dog brake".

Alternatively, the brake 1 can be blocked in terms of rotation with respect to the axle 3 using screws or pegs connecting a flange situated on the brake 1 and a flange situated on the landing gear. The brake is then said to be an "axle casing brake".

OBJECT OF THE INVENTION

The object of the invention is to reduce the mass of an aircraft landing gear comprising a braked wheel.

SUMMARY OF THE INVENTION

In order to achieve this objective, there is proposed an aircraft landing gear comprising an axle, a wheel borne by the axle and having a rim mounted to rotate about a longitudinal axis of the axle, a stack of discs arranged to impose a braking torque on the wheel in response to a pressure imposed on the stack of discs, at least one electromechanical actuator extending facing the stack of discs in order in a controlled manner to apply the imposed pressure to the stack of discs, and an actuator bearer designed to bear the electromechanical actuator, the electromechanical actuator being fixed to the actuator bearer while at the same time being demountable. The actuator bearer is incorporated into the axle in such a way that the axle and the actuator bearer form a single component.

By incorporating the actuator bearer into the axle, the carriers (in the case of a brake of the dog brake type) or the flanges (in the case of a brake of the axle casing type) mentioned above are eliminated, as are the connecting elements (pin, screws, pegs) that react the braking torque. Regions of the actuator bearer that make the connection between the various electromechanical actuators (in the case that a plurality of electromechanical actuators are borne by the actuator bearer) are also eliminated.

This then significantly reduces the mass of the means used to brake the wheel, and therefore the mass of the aircraft landing gear.

Other features and advantages of the invention will become apparent from reading the following description of some particular nonlimiting embodiments of the invention.

BRIEF DESCRIPTION OF THE DRAWINGS

Reference will be made to the attached drawings among which:

FIGS. 3a, 3b and 3c depict means for blocking the rotation and means for axially blocking a torque tube of the aircraft landing gear according to the first embodiment of the invention;

FIG. 4 is a perspective view of the torque tube of the aircraft landing gear according to the first embodiment of the invention;

FIG. 5 is a view in cross section of an axle and of a braked wheel assembly of an aircraft landing gear according to a second embodiment of the invention;

FIGS. 6a and 6b depict means of angularly positioning a torque tube of the aircraft landing gear according to the second embodiment of the invention;

DETAILED DESCRIPTION OF THE INVENTION

Figure 1:
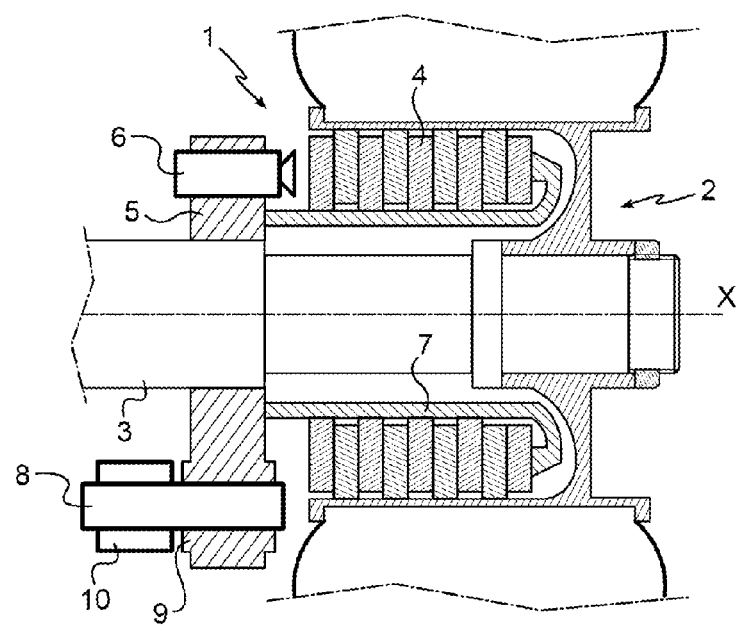
FIG. 1 is a view in cross section of an axle and of a braked wheel assembly of an aircraft landing gear of the prior art.
Figure 2:
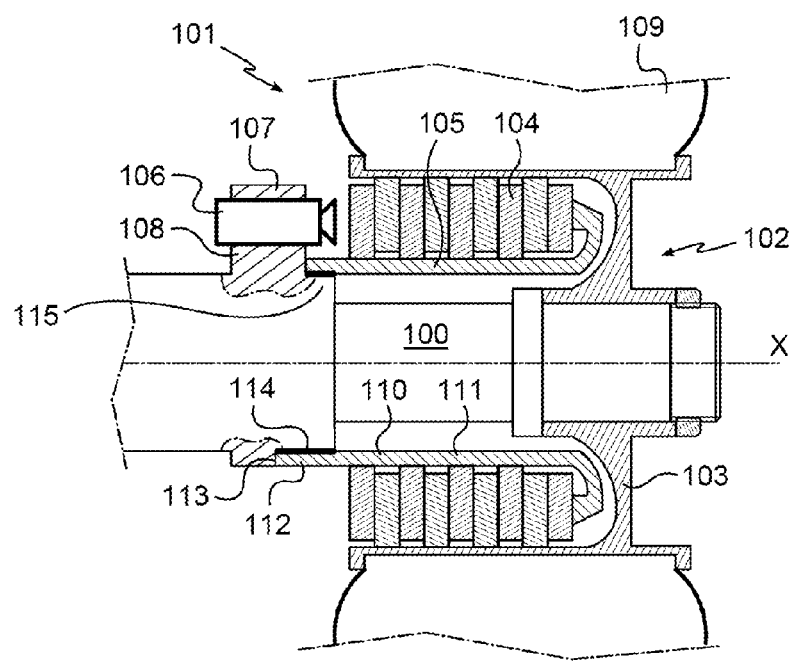
FIG. 2 is a view in cross section of an axle and of a braked wheel assembly of an aircraft landing gear according to a first embodiment of the invention.

According to a first embodiment illustrated in FIGS. 2 to 4, the aircraft landing gear comprises a box in which a rod slides. The box is articulated to the aircraft and is stabilized in a lower position by a bracing member. The rod bears an axle 100 at the bottom part, the axle being intended to accept a braked wheel assembly 101.

The braked wheel assembly 101 comprises a wheel 102 comprising a rim 103 which bears a tyre 109 and which is mounted to rotate about an axis of rotation X of the rim 103 by means of rolling bearings, the axis of rotation X of the rim 103 being a longitudinal axis X of the axle 100.

Inside the rim 103 there extends a stack of discs 104 having a central axis X that coincides with the axis of rotation X of the rim 103. The discs are friction discs in this instance made of carbon. The stack of discs 104 comprises an alternation of rotor discs, which are constrained to rotate with the rim 103 by the effect of appendages being engaged with splines extending inside the rim 103, and of stator discs which are constrained to remain rotationally immobile. The stator discs are secured in terms of rotation to a torque tube 105 fixed to the axle 100. The torque tube 105 will be described in greater detail later on in the following part of this description.

The stack of discs 104 is designed to impose a braking torque on the wheel 102 in response to a pressure imposed on the stack of discs 104. A plurality of electromechanical actuators 106 extends facing the stack of discs 104 in order in a controlled manner to apply the imposed pressure to the stack of discs 104.

The electromechanical actuators 106 are borne by an actuator bearer 107. The actuator bearer 107 comprises a plurality of actuator supports 108 which extend radially from the axle 100, namely in a direction perpendicular to the longitudinal axis X of the axle 100.

The collection of actuator supports 108 and therefore the actuator bearer 107 are incorporated into the axle 100 in such a way that the axle 100 and the actuator bearer 107 (and therefore the actuator supports 108) form a single component.

Each actuator support 108 is intended to accept an electromechanical actuator 106. Each actuator support 108 therefore comprises a place for accommodating an electromechanical actuator 106 and fixing means for fixing the electromechanical actuator 106 to the actuator support 108.

Each electromechanical actuator 106 is fixed to an actuator support 108 while at the same time being demountable. Installing, removing and replacing an electromechanical actuator 106 are therefore operations performed during interventions which are performed directly on the landing gear axle 100.

The torque tube 105 and the way in which the torque tube 105 is fixed to the axle 100 will now be described in greater detail.

The torque tube 105 extends around the axle 100. The torque tube 105 comprises a cylindrical main part 110. A first portion 111 of the cylindrical main part 110 extends between the stack of discs 104 and the axle 100. A second portion 112 of the cylindrical main part 110, delimited at one of its ends by a free end 113 of the torque tube 105, itself rests on a cylindrical sleeve 114 arranged for this purpose around one end of an enlarged portion 115 of the axle 100, against the actuator bearer 107.

The torque tube 105 is fixed to the axle 100 by fixing means.

The torque tube 105 fixing means comprise means for blocking the rotation of the torque tube 105 about the longitudinal axis X of the axle 100 and means of axially blocking the torque tube 105 along the longitudinal axis X of the axle 100.

The rotational-blocking means react the braking torque. The axial-blocking means react the pressure load developed by the electromechanical actuators 106.

The rotational-blocking means comprise first rotation-blocking means formed on the free end 113 of the torque tube 105 and second rotation-blocking means formed on the enlarged portion 115 of the axle 100.

The axial-blocking means likewise comprise first axial-blocking means formed on the free end 113 of the torque tube 105 and second axial-blocking means formed on the enlarged portion 115 of the axle 100.

The rotation-blocking and axial-blocking means in this instance consist of axial protrusions 120 of the torque tube 105 and of housings 121 formed on the enlarged portion 115 of the axle 100.

The axial protrusions 120 project out from the free end 113 of the torque tube 105 and in the extension of longitudinal tenons 123 formed on the torque tube 105 and used for rotationally securing the stator discs of the stack of discs 104 to the torque tube 105.

Each axial protrusion 120 comprises an axial portion 124 and a circumferential lug 125 projecting from the axial portion 124.

Each housing 121 comprises an axial section 126 and a circumferential section 127.

When the torque tube 105 is fixed to the axle 100, the torque tube 105 first of all experiences an axial movement during which each axial protrusion 120 is introduced into the axial section 126 of the corresponding housing 121 (see FIG. 3a), then a rotational movement during which the circumferential lug 125 is positioned in the circumferential section 127 of the corresponding housing 121 (see FIGS. 3b and 3c).

When the circumferential lug 125 is positioned in the circumferential section 127 of the housing 121, a closed end 128 of the circumferential section 127 of the housing 121 forms a rotation end stop blocking the rotation of the circumferential lug 125, and an internal lateral wall 129 of the circumferential section 127 of the housing 121 forms an axial end stop blocking the circumferential lug 125 axially.

The first rotation-blocking means formed on the free end 113 of the torque tube 105 therefore comprise the axial protrusions 120 and their circumferential lugs 125.

The second rotation-blocking means formed on the axle 100 are therefore made up of each housing 121 and, more specifically, of the closed end 128 of the circumferential section 127 of each housing 121. Braking torque is reacted by contact between the circumferential lug 125 of each axial protrusion 120 and the closed end 128 of the circumferential section 127 of each housing 121, in a direction orthogonal to the load generated by the braking torque at this interface.

The first axial-blocking means formed on a free end 113 of the torque tube 105 likewise comprise the axial protrusions 120 and therefore the circumferential lugs 125 thereof.

The second axial-blocking means formed on the axle 100 are made up of each housing 121 and, more specifically, of the internal lateral wall 129 of the circumferential section 127 of each housing 121. The pressure load is reacted by contact between the circumferential lug 125 of each axial protrusion 120 and the internal lateral wall 129 of the circumferential section 127 of each housing 121 in a direction orthogonal to the pressure load at this interface.

The landing gear additionally comprises means of angularly positioning the torque tube 105 on the axle 100.

The angular-positioning means comprise an axial tab 130 which projects out from the free end 113 of the torque tube 105. The axial tab comprises a first fixing hole 131.

The angular-positioning means further comprise a second fixing hole 132 made on the axle 100, here near one of the housings 121.

The torque tube 105 is held on the landing gear and the torque tube 105 is held in the correct angular position on the landing gear by an indexing screw which extends through the first fixing hole 131 and into the second fixing hole 132. The indexing screw does not contribute to reacting the braking torque or the pressure load.

With reference to FIGS. 5, 6a and 6b, the aircraft landing gear according to a second embodiment once again comprises a torque tube 200 fixed to the axle 201 by fixing means.

The torque tube 200 comprises a cylindrical main part 202 and a shoulder or "tube foot" 203 which extends radially on the inside of the torque tube 200 from the cylindrical main part 202.

The fixing means comprise rotational-blocking means and axial-blocking means.

The means for blocking rotation and reacting axial load are similar to the means described for the aircraft landing gear according to the first embodiment and will not be described again.

The hub nut 207, when tightened, brings the rim 208 of the wheel against the tube foot 203 and the torque tube 200 against the axle 201. It is preferable to leave a clearance after the hub nut 207 has been tightened so that the load is correctly reacted by the radial lugs of the torque tube 200.

The landing gear additionally comprises means of angularly positioning the torque tube 200 on the axle 201.

The angular-positioning means comprise an axial portion 210 projecting out from the free end of the torque tube 200. The axial portion 210 has the shape of a sawtooth. The angular-positioning means also comprise a housing 211 formed on the axle 201. The housing 211 has a shape that complements the sawtooth shape of the axial portion 210.

When the torque tube 200 is mounted on the axle 201, the axial portion 210 is positioned in the housing 211.

Correct angular positioning of the torque tube 200 on the landing gear (ensuring that the axial protrusions are correctly placed in the housings) is ensured, after the hub nut 207 has been tightened, by the positioning of the axial portion 210 in the housing 211. The tightening of the hub nut 207 clamps the tube foot 203 against a shoulder 205 of the axle 201 and allows alignment of the angular-positioning means and elimination of the angular clearance in the torque reacting direction between the torque tube 200 and the axle 201.

The axial portion 210 and the housing 211 do not contribute to reacting the braking force and the pressure load.

Figure 7:
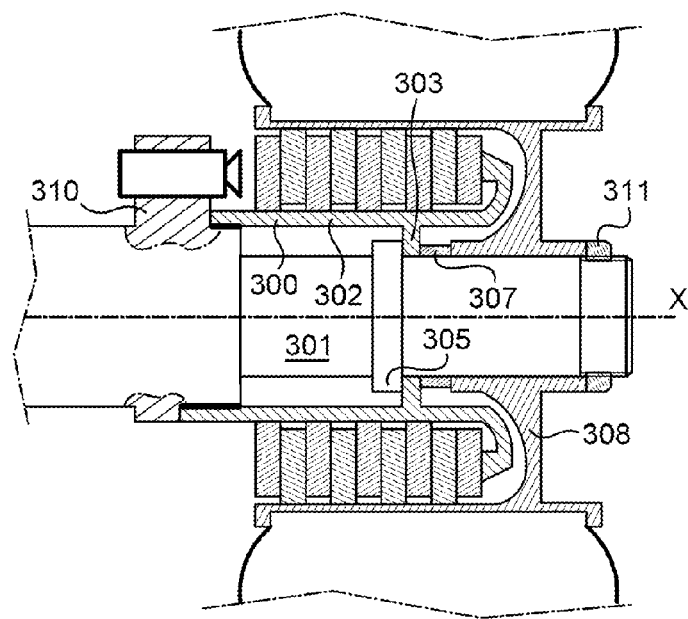
FIG. 7 is a view in cross section of an axle and of a braked wheel assembly of an aircraft landing gear according to a third embodiment of the invention.

With reference to FIG. 7, the aircraft landing gear according to a third embodiment once again comprises a torque tube 300 fixed to the axle 301 by fixing means. The torque tube 300 comprises a cylindrical main part 302 and a tube foot 303, the tube foot 303 being positioned against a shoulder 305 of the axle 301. The shoulder 305 of the axle 301 forms an axial end stop and extends radially from the axle 301.

The fixing means comprise rotation-blocking means and axial-blocking means.

The rotation-blocking means are relatively similar to the rotation-blocking means described for the aircraft landing gear according to the first embodiment. However, the rotation-blocking means are simpler.

The rotation-blocking means comprise first rotation-blocking means formed on the axle 301 and second rotation-blocking means formed on a free end of the torque tube 300.

The first rotation-blocking means comprise axial protrusions of the torque tube 300.

The axial protrusions are situated, just as in the aircraft landing gear according to the first embodiment, in the extension of tenons of the torque tube 300 which are used for rotationally securing the stator discs to the torque tube 300.

The axial protrusions this time do not have a radial lug projecting from the axial portion.

When the torque tube 300 is fixed to the axle 301, the axial protrusions are positioned in the housings through a simple axial movement that is not followed by a radial movement as it was with the rotation-blocking means of the aircraft landing gear according to the first embodiment.

Braking torque is reacted by contact between the axial protrusions and the lateral walls of the housings.

The axial-blocking means themselves comprise an intermediate hub nut 307 screwed around the axle 301.

The intermediate hub nut 307 is this time positioned between the rim 308 of the wheel and the tube foot 303.

The intermediate hub nut 307, when tightened, clamps the tube foot 303 against a shoulder 305 of the axle 301. The intermediate hub nut 307 is engineered to withstand the pressure load.

The positioning of the intermediate hub nut 307 makes the intermediate hub nut 307 accessible to an operator, possibly using a tool.

It will be noted that a hub nut 311 at the free end of the axle 301 is still needed to axially block the rim 308 of the wheel.

It will also be noted that the hub nut 311 could be used for direct axial blocking of the torque tube 300. However, that solution potentially exhibits the disadvantage of placing constraints on the sizing of the rim 308 of the wheel and of the hub nut 311.

The aircraft landing gear according to the third embodiment of the invention requires no means of angular positioning of the torque tube 308 on the axle 301 (because there is no angular clearance in the absence of radial load reacting lugs).

Figure 8:
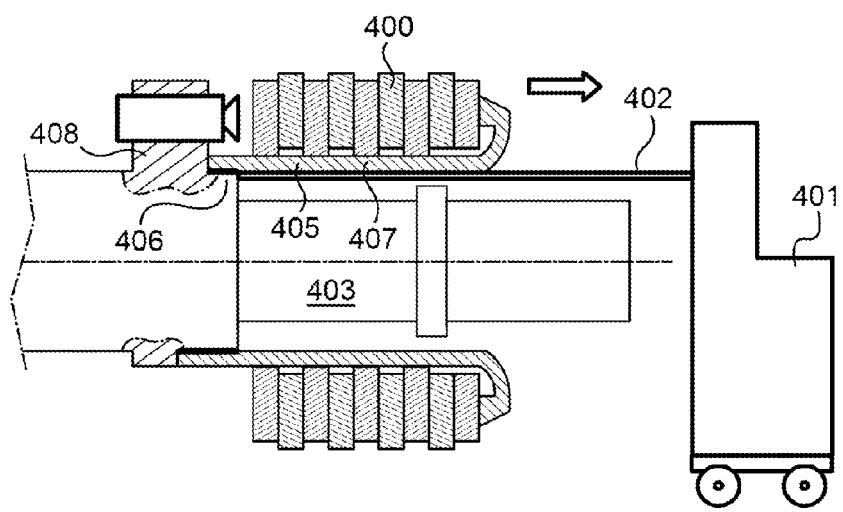
FIG. 8 schematically depicts a method of demounting a stack of discs from a landing gear according to any one of the embodiments of the invention.

A demounting method is finally described with reference to FIG. 8, this method being intended for the relatively simple and quick demounting, during a maintenance operation for example, of the stack of discs 400 from a landing gear according to one of the embodiments of the invention described hereinabove.

The method of demounting the stack of discs 400 is carried out here by an operator using a mobile maintenance device 401. The mobile maintenance device 401 is itself mobile (being, for example, fitted with wheels), or alternatively is mounted on mobile equipment (for example a trolley). The mobile maintenance device 401 comprises a horizontal support element 402.

The mounting method first of all consists in demounting the wheel from the axle 403 and moving the wheel away from the landing gear.

The operator then brings the mobile maintenance device 401 up close to the landing gear. The horizontal support element 402 is introduced into the torque tube 405 parallel to the axle 403, and is positioned between the axle 403 and an upper part of the torque tube 405. A free end of the horizontal support element 402 is brought into contact with (or into the immediate vicinity of) the enlarged portion 406 of the axle 403 on which the cylindrical main part 407 of the torque tube 405 rests (via a cylindrical sleeve).

The operator then acts on the means of fixing of the torque tube 405 in order to demount the torque tube 405, then offsets the torque tube 405 so that the torque tube 405 rests on the horizontal support element 402 of the mobile maintenance device 401.

The operator then moves the mobile maintenance device 401 away from the landing gear, demounts the stack of discs 400 from the torque tube 405, then installs a new stack of discs 400 on the torque tube 405.

The operator then moves the mobile maintenance device 401 closer to the landing gear, then positions the horizontal support element 402 above the axle 403 and parallel thereto. The operator brings the free end of the horizontal support element 402 into contact with (or into the immediate vicinity of) the enlarged portion 406 of the axle 403, moves the torque tube 405 toward the actuator bearer 408, and repositions the torque tube 405 on the axle 403.

Finally, the operator acts on the means of fixing of the torque tube 405 in order once again to fix the torque tube 405 to the axle 403.

Of course, the invention is not restricted to the embodiments described but encompasses any alternative form that falls within the scope of the invention as defined by the claims.

Although it has been indicated that the actuator bearer bears a plurality of actuators, it is perfectly conceivable to use just one actuator.

Likewise, it is perfectly conceivable to have one or several axial protrusions, one or several housings, one or several fixing tabs, one or several fixing holes, one or several indexing screws, etc. It would also be conceivable for the axial protrusions to be situated on the axle and the housings on the torque tube. In general, the number and shape of the various elements involved in the rotation blocking, axial blocking and angular positioning of the torque tube on the axle are dimensioned according to the characteristics of the landing gear and according to the pressure load and braking torque that need to be reacted.

Mention has been made here of an actuator bearer incorporated into the axle and comprising a plurality of actuator supports, likewise incorporated into the axle. In this instance, the actuator bearer is therefore made up only of the collection of actuator supports, but it is conceivable for the actuator bearer to also comprise one or more additional elements likewise incorporated into the axle (for example a cylindrical base formed on the axle and from which the actuators extend).

The invention claimed is:

1. An aircraft landing gear comprising:
   an axle (100; 201; 301; 403),
   a wheel (102) borne by the axle and having a rim (103; 208; 308) mounted to rotate about a longitudinal axis (X) of the axle,
   a stack of discs (104; 400) arranged to impose a braking torque on the wheel in response to a pressure imposed on the stack of discs,
   at least one electromechanical actuator (106) extending facing the stack of discs in order in a controlled manner to apply the imposed pressure to the stack of discs, and
   an actuator bearer (107; 310) designed to bear the electromechanical actuator, the electromechanical actuator being fixed to the actuator bearer while at the same time being demountable, the actuator bearer being incorporated into the axle in such a way that the axle and the actuator bearer form a single component,
   the aircraft landing gear further comprising a torque tube (105; 200; 300; 405) which extends around the axle between the stack of discs and the axle and to which stator discs of the stack of friction discs are rotationally secured, the torque tube being fixed to the axle while at the same time being demountable, by fixing means comprising means for blocking the rotation of the torque tube about the longitudinal axis of the axle and means of axially blocking the torque tube along the longitudinal axis of the axle, a free end of the torque tube having a circular edge,
   the rotational-blocking means and/or the axle axial-blocking means comprising first blocking means formed on a free end (113) of the torque tube and second blocking means integrally formed with the axle, the second blocking means and the axle forming a single component, the first blocking means and the second blocking means having complementary shapes which are positioned in one another when the torque tube is mounted, the first blocking means comprising an axial protrusion (120),
   wherein the axial protrusion comprises an axial portion (124) and a circumferential lug (125) projecting from the axial portion, and
   wherein the axial protrusion projects out and does not extend around an entire circumference of the free end of the torque tube.

2. The aircraft landing gear according to claim 1, in which the actuator bearer comprises an actuator support (108) to which the electromechanical actuator is fixed and which extends radially from the axle.

3. The aircraft landing gear according to claim 1, in which the axial protrusion is situated in the extension of a tenon (123) of the torque tube used for rotationally securing the stator discs to the torque tube.

4. The aircraft landing gear according to claim 1, in which the second blocking means comprise a housing (121) formed on the axle which comprises an axial section (126) and a circumferential section (127).

5. The aircraft landing gear according to claim 1, in which the axial-blocking means comprise a hub nut (307) screwed around the axle.

6. The aircraft landing gear according to claim 5, in which the hub nut (307) is positioned between the rim of the wheel and the actuator bearer.

7. The aircraft landing gear according to claim 1, further comprising means for angular positioning of the torque tube on the axle.

8. The aircraft landing gear according to claim 7, in which the angular-positioning means comprise an axial tab (130) which projects out from the free end of the torque tube.

9. The aircraft landing gear according to claim 7, in which the angular-positioning means comprise an axial portion (210) which extends out from the free end of the torque tube and has the shape of a sawtooth.

10. A method of demounting a stack of discs of an aircraft landing gear according to claim 1, comprising:
    demounting the wheel from the aircraft landing gear;
    bringing up close to the aircraft landing gear a mobile maintenance device (401) comprising a horizontal support element (402);
    positioning the horizontal support element of the mobile maintenance device parallel to a longitudinal axis of the axle, between the axle and an upper part of the torque tube;
    demounting the torque tube from the axle and of offsetting the torque tube in such a way that the torque tube rests on the horizontal support element of the mobile maintenance device; and
    moving the mobile maintenance device away from the aircraft landing gear.

11. The method of demounting a stack of discs according to claim 10, further comprising:
    replacing the stack of discs; and
    moving the mobile maintenance device closer to the aircraft landing gear and of repositioning the torque tube on the axle.

* * * * *